Patented Apr. 30, 1940

2,199,224

UNITED STATES PATENT OFFICE 2,199,224

OILPROOF MATERIAL

Everett C. Hughes, Cleveland, Ohio, assignor to The Standard Oil Company, Cleveland, Ohio, a corporation of Ohio No Drawing. Application June 21, 1937, Serial No. 149,478

1 Claim. (Cl. 91—68)

While the production of waterproof materials is an easily accomplished matter, and material capable of resisting greases such as encountered in foodstuffs is not much more difficult, the preparation of materials actually resistant against such highly penetrating and softening liquids as petroleum has constituted a problem of extreme difficulty. Many substances which at first give promise of success, and which are in fact suitable on more or less extended usage, are ultimately found to develop defects of one kind or another. In accordance with the present invention however, an oilproof material may be had which is peculiarly stable and enduring in its properties, and yet without undue cost of production.

To the accomplishment of the foregoing and related ends, the invention, then, comprises the features hereinafter fully described, and particularly pointed out in the claims, the following description setting forth in detail certain illustrative embodiments of the invention, these being indicative however, of but a few of the various ways in which the principle of the invention may be employed.

In accordance with the invention, a composition is prepared involving a stable oxidized abietic acid material primarily. Abietic acid is, as known, a constituent of rosin, but rosin, even though modified by various agents, as has been set forth many times in prior literature, retains an inherently soluble and unstable character precluding satisfactory results in oilproofing compositions. However, where abietic acid, and accompanying resin acids, is oxidized and associated with smaller amounts of polyphenols, allied material and the like, as available from Southern long leaf pine, a primary substance is had which can be further treated in accordance with the invention to attain a remarkable oilproof product. Oxidation is readily carried out by means well known in chemical industries, and there is a conjugation of molecules and formation of a stable complex which is thermoplastic. Where desired, instead of subjecting abietic acid to oxidizing treatment and poly-phenols etc., a convenient substance is commercially available in "vinsol" resin. This commercial substance has a melting point of about 119° C., and is thermoplastic. The artificial resin base however provided is now in accordance with the invention, compounded with a non-volatilizing softening agent, such as castor oil, or equivalent plasticizer, in amount of 5 to 35 per cent by weight, based on the artificial resin. I further admix a thinning liquid, a volatile solvent, to consistency suitable for application and combining with the materials to be oilproofed, which may be of any desired character, ordinarily cellulosic, as for instance cheap grades of stock such as chip board, chestnut board, or higher grades of stock, such as kraft, rag stock, etc., as preferred in any given instance. Container body structures thus may be oilproofed internally with particular advantage or both inside and out. The volatile thinning liquid may be ethanol or denatured ethyl alcohol, methanol, chloroform, alcohol and amyl acetate, alcohol and butyl acetate, acetone, ether and ethyl acetate, ethylene dichloride, and the like. That is, the thinning agent is an active solvent which after accomplishing its function can be volatilized at a relative low temperature. The amount of solvent is low depending upon the particular materials being operated with, and in general may be 15 to 60 per cent by weight.

As an example: 50 per cent of "vinsol" resin and 17 per cent of castor oil and 33 per cent of denatured ethyl alcohol are incorporated together, the portions being by weight. Sheet cellulosic material, as for instance sheet stock or a paper container, such as of plural layer chip board, is treated with this material, the solution being flowed on or applied in any convenient manner, and the volatile solvent is driven off by moderate heating for a short time.

Depending upon the amount of the volatile solvent or thinner, impregnation or surface layer coating may be had as desired. The surface so obtained on cellulosic material for instance, is remarkably stable and oilproof. The composition base being oxidized does not deteriorate on exposure to air, and it remains flexible either hot or cold. In conditions of storage with oil directly in contact with surfaces so treated, capillary escape through the material does not occur, and the oil does not take up or attack the treated surface.

Other modes of applying the principle of the invention may be employed, change being made as regards the details described, provided the features stated in the following claim, or the equivalent of such, be employed.

I therefore particularly point out and distinctly claim as my invention:

An oil and greaseproof container structure having its walls of at least one layer of sheet cellulose and an inside coating thereon deposited from a composition of approximately 50% oxidized abietic acid, approximately 17% castor oil and approximately 33% denatured ethyl alcohol, the percentages being by weight, said inside coating preventing escape of oil through the cellulose wall.

EVERETT C. HUGHES.